United States Patent
Berger et al.

(10) Patent No.: US 7,599,300 B2
(45) Date of Patent: Oct. 6, 2009

(54) CABLE MODEM ANALYSIS SYSTEM AND METHOD THEREFOR FOR AN HFC CABLE NETWORK

(75) Inventors: William H. Berger, Austin, TX (US); Todd P. Bowen, Austin, TX (US)

(73) Assignee: Time Warner Cable, Inc., Stamford, CT (US)

( * ) Notice: Subject to any disclaimer, the term of this patent is extended or adjusted under 35 U.S.C. 154(b) by 539 days.

(21) Appl. No.: 11/215,869

(22) Filed: Aug. 31, 2005

(65) Prior Publication Data
US 2007/0047449 A1    Mar. 1, 2007

(51) Int. Cl.
H04L 12/26 (2006.01)
(52) U.S. Cl. ...................................... 370/241
(58) Field of Classification Search ......... 370/241–244, 370/250; 379/1.01–1.04
See application file for complete search history.

(56) References Cited

U.S. PATENT DOCUMENTS

| | | | |
|---|---|---|---|
| 5,375,126 A * | 12/1994 | Wallace ...................... 714/712 |
| 5,432,542 A | 7/1995 | Thibadeau et al. |
| 5,666,481 A | 9/1997 | Lewis |
| 5,884,284 A * | 3/1999 | Peters et al. ................... 705/30 |
| 5,987,135 A | 11/1999 | Johnson et al. |
| 6,000,045 A | 12/1999 | Lewis |
| 6,272,150 B1 | 8/2001 | Hrastar et al. |
| 6,393,478 B1 | 5/2002 | Bahlmann |
| 6,445,773 B1 * | 9/2002 | Liang et al. ................. 379/1.04 |
| 6,481,011 B1 | 11/2002 | Lemmons |
| 6,526,582 B1 | 2/2003 | Brodigan et al. |
| 6,598,057 B1 * | 7/2003 | Synnestvedt et al. ........ 707/200 |
| 6,704,288 B1 | 3/2004 | Dziekan et al. |
| 6,769,127 B1 | 7/2004 | Bonomi et al. |
| 6,898,800 B2 | 5/2005 | Son et al. |
| 6,947,980 B1 * | 9/2005 | Knudsen et al. ............. 709/223 |
| 7,111,318 B2 | 9/2006 | Vitale et al. |
| 7,188,116 B2 | 3/2007 | Cheng |
| 7,227,889 B1 | 6/2007 | Roeck et al. |
| 7,251,820 B1 | 7/2007 | Jost et al. |
| 7,290,046 B1 | 10/2007 | Kumar |
| 7,313,749 B2 | 12/2007 | Nerl et al. |
| 7,343,614 B1 | 3/2008 | Hendricks et al. |
| 2001/0034852 A1 | 10/2001 | Kawashima |
| 2002/0019983 A1 | 2/2002 | Emsley et al. |
| 2002/0061012 A1 * | 5/2002 | Thi et al. ..................... 370/352 |
| 2002/0109879 A1 * | 8/2002 | Wing So ..................... 359/118 |

(Continued)

*Primary Examiner*—Dmitry Levitan
(74) *Attorney, Agent, or Firm*—The Marbury Law Group PLLC (57) ABSTRACT

A modem checker diagnostic toolkit comprises a modem checker client and a modem analysis server. The modem checker client comprises a modem query interface to communicate with the modem analysis server to acquire information indicative of the operational status of a modem and to display the information graphically. A user requests data relating to a particular modem by entering the MAC address of the modem into a query field. The modem checker client interacts with the modem analysis server to acquire information relating to the subscriber associated with the modem MAC address, the services authorized for the modem, and data indicative of the status and performance of the modem. In addition, the modem analysis server interacts with the modem operating system to retrieve modem performance data from modem logs. The modem checker client further provides a link that directs the modem analysis server for remotely resetting the modem regardless of its current status.

30 Claims, 5 Drawing Sheets

U.S. PATENT DOCUMENTS

| | | |
|---|---|---|
| 2002/0136165 A1* | 9/2002 | Ady et al. .................... 370/241 |
| 2002/0143775 A1* | 10/2002 | Wilkinson et al. ............ 707/10 |
| 2003/0020765 A1 | 1/2003 | Kussmaul et al. |
| 2003/0028891 A1 | 2/2003 | Hardt et al. |
| 2003/0036848 A1 | 2/2003 | Sheha et al. |
| 2003/0040936 A1* | 2/2003 | Nader et al. .................... 705/1 |
| 2003/0145075 A1 | 7/2003 | Weaver et al. |
| 2003/0163831 A1 | 8/2003 | Gall et al. |
| 2003/0167319 A1* | 9/2003 | Venkatesulu et al. ........ 709/223 |
| 2004/0008761 A1* | 1/2004 | Kelliher et al. .............. 375/222 |
| 2004/0044554 A1 | 3/2004 | Bull et al. |
| 2004/0054771 A1 | 3/2004 | Roe et al. |
| 2004/0111311 A1 | 6/2004 | Ingman et al. |
| 2004/0120250 A1 | 6/2004 | Langevin et al. |
| 2005/0039213 A1 | 2/2005 | Matarese et al. |
| 2005/0111063 A1 | 5/2005 | Shar et al. |
| 2005/0144641 A1 | 6/2005 | Lewis |
| 2005/0183130 A1 | 8/2005 | Sadja et al. |
| 2005/0204290 A1 | 9/2005 | Eddy et al. |
| 2005/0286466 A1* | 12/2005 | Tagg et al. ................... 370/329 |

* cited by examiner

| 202 MAC TO QUERY: | [VALUE] |
|---|---|

| 210 SMS INFORMATION ||
|---|---|
| STATUS IN SMS | [VALUE] |
| ACCT#: | [VALUE] |

| 215 MODEM STATUS ||
|---|---|
| CURRENT: | [VALUE] |
| 10NET IP ADDR: | [VALUE] |
| MODEM TYPE: | [VALUE] |

| 220 PUBLIC IP ADDRESS ||
|---|---|
| AVAILABLE: | [VALUE] |
| ACTIVE: | [VALUE] |
| PUBLIC IP ADDR: | [VALUE] |
| TYPE: | [VALUE] |
| NIC MAC: | [VALUE] |
| NIC MFR: | [VALUE] |

( CLEAR )

| 225 LDAP INFORMATION ||
|---|---|
| STATUS IN LDAP: | [VALUE] |
| BIN | [VALUE] |
| ISP | [VALUE] |

| 230 NETWORK INFORMATION ||
|---|---|
| ROUTER: | [VALUE] |
| PORT: | [VALUE] |
| FIRMWARE: | [VALUE] |

| 235 SIGNAL INFORMATION ||
|---|---|
| TRANSMIT: | [VALUE] |
| RECEIVE: | [VALUE] |
| SIGNAL/NOISE | [VALUE] |

200 CONTINUED ON FIGURE 2B

265 SUBSCRIBER ROUTER INFORMATION

| NAT STATUS: | [VALUE] |
|---|---|
| ETHERNET: | [VALUE] |
| FIRMWARE: | [VALUE] |
| SID: | [VALUE] |
| CHANNEL: | [VALUE] |
| WEP STATUS: | [VALUE] |
| USB | [VALUE] |
| ACCESS LIMITS: | [VALUE] |

200 CONTINUED FROM FIGURE 2A

240 UPTIME INFORMATION

| CURRENT UPTIME | [VALUE] |
|---|---|
| PERCENTAGE ONLINE | [VALUE] |

245 PORT SUMMARY

| PORT SUMMARY: | [VALUE] |
|---|---|
| PERCENTAGE ONLINE | [VALUE] |
| PORT SNR | [VALUE] |

260 NAT CLIENTS

| NAT IP ADDRS: | CONNECTION | NIC MAC ADDR |
|---|---|---|
| [VALUE] | [VALUE] | [VALUE] |
| [VALUE] | [VALUE] | [VALUE] |

CABLE MODEM ANALYSIS SYSTEM AND METHOD THEREFOR FOR AN HFC CABLE NETWORK

BACKGROUND

Embodiments of this invention are generally related to cable network diagnostics and more particularly related to obtaining operational and usage data from a cable modem.

In the cable environment, access to the cable network's data service is provided through a cable modem (CM). Increasingly, CMs are required to comply with an industry standard referred to as the "Data Over Cable Service Interface Specification" or DOCSIS. DOCSIS provides a set of standards and a certifying authority by which cable companies can achieve cross-platform functionality in Internet delivery. A DOCSIS compliant cable network comprises cable modem termination systems (CMTSs) and cable modems that form the interface to digital communications over the cable network.

A cable modem connected to the cable network is "provisioned" on boot-up. Provisioning involves a process by which the cable modem is initialized, authenticated, registered, and configured to operate with a cable network. Provisioning results in a cable modem being assigned an IP address that is recognized by the cable network and receiving a bootfile that, among other functions, determines the services that the subscriber is entitled to receive.

A cable modem may be standalone device or it may be integrated into other two-way devices. Its most common application is as an interface between a subscriber's computer and the subscriber's Internet service provider (ISP). The cable modem may also be used in conjunction with a set top box (STB) to provide an upstream digital channel for interactive television and in conjunction with a media terminal adapter (MTA) to provide voice over Internet protocol (VoIP) services. In these latter applications, the cable modem is integrated with the device that it is supporting.

Cable modems may also be integrated with wired and wireless routers, thereby allowing multiple devices to share a single cable connection. A cable modem router comprises a basic dynamic host configuration protocol (DHCP) server that assigns private IP addresses to the network devices connected to the cable modem/router.

When a problem arises in the provision of a digital cable service, a subscriber expects the cable operator to take quick and effective remedial action. From the cable operator's perspective, it is important to determine whether a problem actually exists, and if so, what the source of the problem is. Because sending a cable service technician (CST) to the subscriber's location is a costly undertaking, it is also important to determine whether a fault can be identified and remedied before a CST is sent to a subscriber location.

What would be useful is a diagnostic tool for ascertaining the operational status of a cable modem and for acquiring usage data remotely from the cable modem.

SUMMARY

In an embodiment of the present invention, a modem checker diagnostic toolkit comprises a modem checker client and a modem analysis server. The modem checker client comprises a modem query interface (herein, "MQI") to communicate with the modem analysis server to acquire information indicative of the operational status of a modem and to display the information graphically. In this embodiment, the modem checker client comprises the MQI, a processor, a display, a user input, and a LAN interface. In another embodiment of the present invention, the processor, the display, the user input, and a LAN interface functions of the modem checker client are provided by a general purpose computing device, the MQI functionality is provided by a Web browser, and the modem analysis server operates a Web server.

A user requests data relating to a particular modem by entering the MAC address of the modem into a query field. The modem checker client interacts with the modem analysis server to acquire information relating to the subscriber associated with the modem MAC address, the services authorized for the modem, and data indicative of the status and performance of the modem. By way of illustration and not as a limitation, the modem checker client displays administrative information comprising subscriber identifying information and account information. In addition, the modem analysis server interacts with the modem operating system to retrieve modem performance data from modem logs. The modem checker client further provides a link that directs the modem analysis server for remotely resetting the modem regardless of its current status.

The modem checker diagnostic toolkit also displays information indicative of the operation of the cable modem. By way of illustration and not as a limitation, such operational information comprises the modem status—whether the modem is online or offline, the firmware used by the modem, the IP address of the modem, the public IP addresses assigned to the modem and the MAC addresses of the network interface devices to which those IP addresses are assigned, and modem signal information. Additionally, if the cable modem is integrated with a network router, the IP addresses assigned by the router to network devices connected to the router. If the router is wireless, the modem checker diagnostic toolkit will further display wireless network information.

In an exemplary embodiment of the present invention, the modem checker diagnostic toolkit comprises a result analyzer that analyzes the operational information of a cable modem having a status of "off-line" to determine why the cable modem is non-responsive. By way of illustration and not as a limitation, a modem may be, without limitation, found to be non-responsive because of poor signal levels, unusual wireless configuration settings, out-of-date firmware, and/or problems with components of the cable network through which the modem communicates over the cable network. In another embodiment of the present invention, the analytical process takes into account the type of modem being polled.

It is therefore an aspect of the present invention to use a modem query interface (MQI) to query diverse sources for data relating to a cable modem.

It is another aspect of the present invention to allow a user to customize the MQI by selecting the modem data to be queried and displayed.

It is still another aspect of the present invention to permit the MQI to be operated on portable computing devices.

It is yet another aspect of the present invention to evaluate data relating to a failed modem, to provide a diagnosis of the possible causes for the failure, and to suggest steps to remedy the failure.

These and other aspects of the present invention will become apparent from a review of the description that follows.

In an embodiment of the present invention, a cable modem (CM) analysis server for a hybrid-fiber-coax (HFC) cable network comprises a query library, a query checker processor, and a display server. The query library comprises instructions for acquiring CM state data elements indicative of the state of a CM that is associated with a CM MAC address. The query checker processor generates an interactive graphical display that accepts a query from a modem checker client. In an embodiment of the present invention, the query comprises the CM MAC address and identifies the queried CM state data elements to be obtained for the CM. By way of illustration and not as a limitation, the CM state data elements are selected from the group consisting of subscriber data, CM operational data, network component data, and CM diagnostic data.

In another embodiment of the present invention, the subscriber data comprises a subscriber name, a subscriber address, an account number associated with the subscriber name, the MAC address of the CM, and the subscriber account status. In yet another embodiment of the present invention, CM operational data comprises a CM current status, a private network address assigned to the CM, a modem type, available IP addresses, active IP addresses, a public IP address, a type, a NIC MAC, a status in LDAP, a provisioned BIN FILE, and a hosting ISP. In still another embodiment of the present invention, the CM comprises a wireless router and the CM operational data further comprises network address translation (NAT) client data, NAT status, Ethernet connection status, router firmware identifier, wireless system identifier, transmission channel, wired equivalency privacy status, and access limits. In an embodiment of the present invention, the network component data comprises a network router identifier, a network port identifier, the firmware of the router, a port summary, a port percentage online, a port SNR. In another embodiment of the present invention, the CM diagnostic data comprises an uptime measure, a transmit signal level, a receive signal level, and a modem SNR. In this embodiment, the instructions for acquiring CM diagnostic data from the CM are delivered to the CM as SNMP messages.

The query checker processor executes query instructions from the query library responsive to the queried CM state data elements to obtain the queried CM state data elements. The display server receives CM state data elements, creates a CM analytical record, and sends the CM analytical record to a modem checker client for display. In an embodiment of the present invention, the modem checker client comprises a Web browser and the CM analytical record comprises a Web page.

In another embodiment of the present invention, the CM analysis server further comprises a result analyzer. The result analyzer receives CM state data elements. The result analyzer determines whether a CM state data element is within a predetermined range. If the CM state data element is within a predetermined range, then the result analyzer assigns a first graphical attribute to the CM state data element. If the CM state data element is outside a predetermined range, the result analyzer assigns a second graphical attribute to the CM state data element. The result analyzer provides the CM state data element and an assigned graphical attribute to the display server. The display server uses the CM state data element and the assigned graphical attribute to create the analytical record. In an embodiment of the present invention, the first and second graphical attributes are display colors.

In an alternate embodiment of the present invention, the CM analysis server further comprises a result analyzer. The result analyzer receives CM state data elements and uses these elements to determine whether a CM state data element is within a predetermined range. The result analyzer selects CM state elements determined to be outside a predetermined range, determines if the selected CM state elements are indicative of a common fault, and if the selected CM state elements are indicative of a common fault, identifies the common fault in the analytical record.

In yet another embodiment of the present invention, the CM analysis server further comprises a client network interface adapted to communicate with the CM checker client via a client network. By way of illustration and not as a limitation, the client network may be, without limitation, a wired network, a wireless network, a local area network, or the Internet.

In another embodiment of the present invention, the CM analysis server further comprises a cable network interface that communicates with the CM via a cable network path. In an embodiment of the present invention, the path in the cable network path is a DOCSIS-compliant channel.

An embodiment of the present invention provides a method for evaluating the operational status of a cable modem (CM) in a hybrid-fiber-coax (HFC) cable network. A query is received from a modem checker client. The query comprises a CM MAC address and identifies queried CM state data elements to be obtained for the CM. Query instructions are accessed from a query library responsive to the queried CM state data elements identified in the query. The query instructions are executed to obtain the queried CM state data elements. The CM state data elements are received at a display server. A CM analytical record is created and sent to a modem checker client for display.

In another embodiment of the present invention, the queried CM state data elements are provided to a result analyzer. A determination is made whether a CM state data element is within a predetermined range. If the CM state data element is within a predetermined range, a first graphical attribute is assigned to the CM state data element. If the CM state data element is outside a predetermined range, a second graphical attribute is assigned to the CM state data element. The CM state data element and an assigned graphical attribute are provided to the display server. The analytical record is created using the CM state data element and the assigned graphical attribute.

In an alternate embodiment of the present invention, the queried CM state data elements are provided to a result analyzer. A determination is made whether a CM state data element is within a predetermined range. CM state elements determined to be outside a predetermined range are selected. A determination is made whether the selected CM state elements are indicative of a common fault. If the selected CM state elements are indicative of a common fault, the common fault is identified in the CM analytical record.

DETAILED DESCRIPTION

The following terms are used in the description that follows. The definitions are provided for clarity of understanding:

| | |
|---|---|
| CCS - | Central control system. |
| CM - | Cable modem. A cable modem includes a DOCSIS compliant device that is integrated into another device, such as a set top box, a television, or a DVR. |
| CPE - | Customer premises equipment. |
| HFC - | Hybrid-fiber-coax. A network design that employs both fiber optic and coaxial cables to deliver cable video and data services. |
| IP address - | IP address as used herein means a uniquely addressable identifier associated with network or home equipment. |
| LVP - | Label value pair. As applied to the present application, the "label" is a descriptor of a data element and the "value" represents the value assigned to the data element for a specified modem. |
| Poll - | The verb "poll" means the act of using a utility or command by one network device to request data from another network device. |
| SID - | A system identifier. |
| SMS - | A subscriber management system. |
| Two-way | Describes the capability of a CPE unit to both receive signals from a cable headend or data center in the downstream direction and send signals to the headend or data center in the upstream direction. |
| UBR - | Universal Broadband Router. The UBR is a component of the CMTS and directs packets received from a CM according to the destination IP address of the packet. |
| VOD - | Video on demand. VOD is the generic term for a collection of services such as HBO on demand (HOD), movies on demand (MODULATOR) SVOD (subscription video on demand), FOD (free on demand), and other similar services. |
| WEP - | Wired equivalency privacy. A security protocol for wireless local area networks. |

In an embodiment of the present invention, a modem checker diagnostic toolkit comprises a modem checker client and a modem analysis server. The modem checker client comprises a modem query interface (herein, "MQI") to communicate with the modem analysis server to acquire information indicative of the operational status of a modem and to display the information graphically. The modem analysis server comprises a modem checker query processor, query libraries comprising instructions for acquiring subscriber account information and modem performance data from modem logs, and a result analyzer comprising routines for analyzing the cable modem performance data of non-responsive modems.

In this embodiment, the modem checker client comprises the MQI, a processor, a display, a user input, and a LAN interface. In an embodiment of the present invention, the processor, the display, the user input, and a LAN interface functions of the modem checker client are provided by a general purpose computing device, the MQI functionality is provided by a Web browser, and the modem analysis server operates a Web server.

A user requests data relating to a particular modem by entering the MAC address of a modem into a query field. The modem checker client interacts with the modem analysis server to acquire information relating to the subscriber associated with the modem MAC address, the services authorized for the modem, and data indicative of the status and performance of the modem. By way of illustration and not as a limitation, the modem checker client displays administrative information comprising subscriber identifying information and account information. In addition, the modem analysis server interacts with the modem operating system to retrieve performance data from modem logs. The modem checker client is further adapted for remotely resetting the modem regardless of its current status.

In another embodiment of the present invention, the modem analysis server retains usage data that may be used to trend modem and network performance based upon area of service, equipment type, or customer premise.

Figure 1:
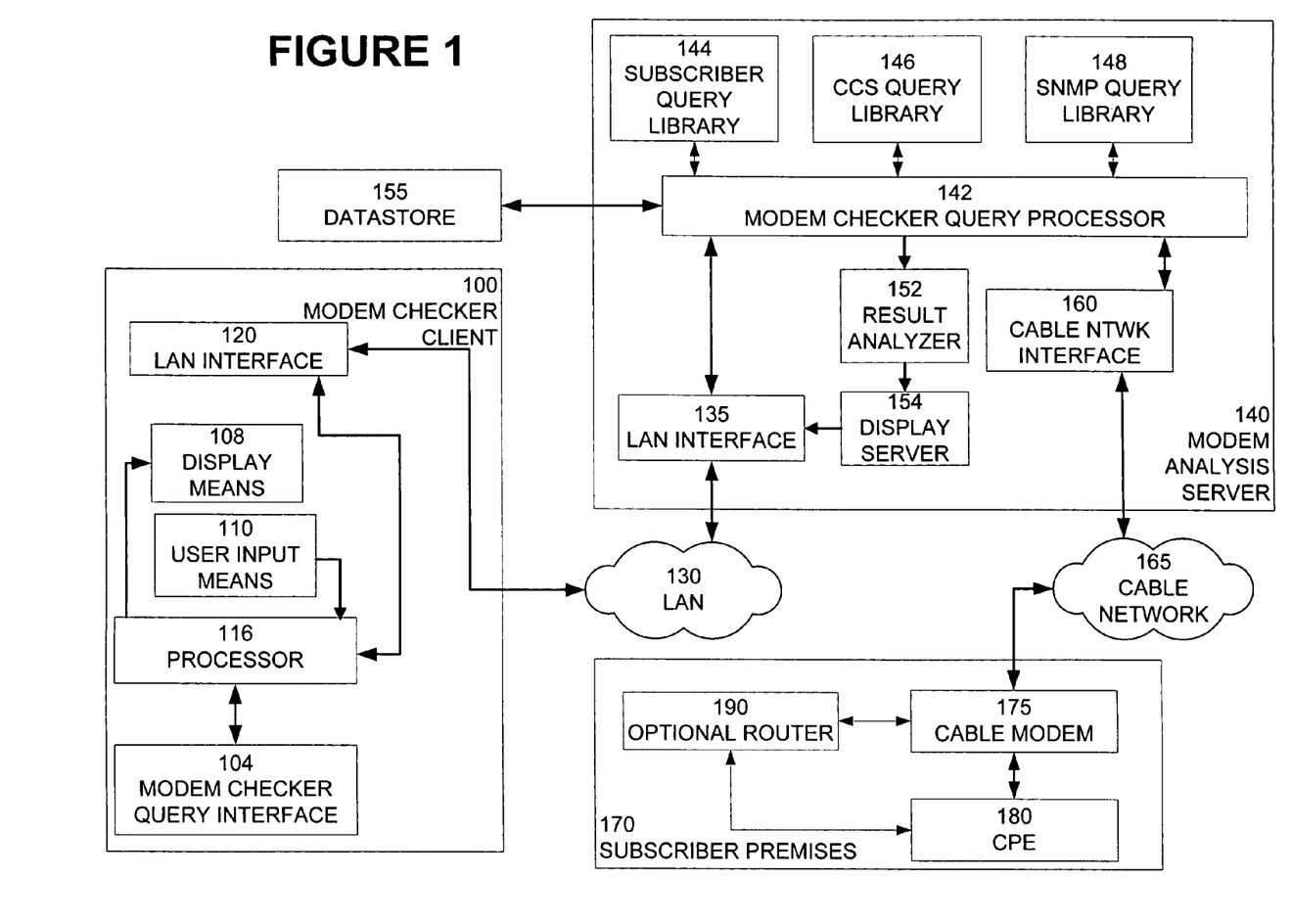
FIG. 1 illustrates the components of a MQI in a cable television system according to an embodiment of the present invention.

FIG. 1 illustrates the components of a modem checker client and server in a cable television system according to an embodiment of the present invention. Referring to FIG. 1, a modem checker client 100 comprises a modem query interface ("MQI") 104, a display 108, a user input 110, a processor 116 and a LAN interface 120.

In an embodiment of the present invention, the display 108, the user input 110, processor 116 and LAN interface 120 are provided by a general purpose computing device. By way of illustration and not as a limitation, the general purpose computing device may be, without limitation, a laptop computer, a personal digital assistant, or a handheld computer. In an exemplary embodiment of the present invention, the LAN interface 120 is a wireless interface, LAN 130 comprises a wireless interface (not illustrated), and the general purpose computing device is a portable computing device. By way of illustration, in an embodiment of the present invention, the portable computing device is an Intermec 6400 Keypad Handheld Computer. As will be appreciated by those skilled in the art, other general purpose and portable wireless computing devices may be used to provide the functions of display 108, user input 110, processor 116 and LAN interface 120 without departing from the scope of the present invention.

Display 108 may be, without limitation, an LCD, a plasma, or other display device. Input 110 may be, without limitation, a mouse, a touch pad, a keypad, a key board, a touch-sensitive screen, a voice recognition system or other input device suitable for the particular computing device providing the functions of modem checker client 100.

In an embodiment of the present invention, the functionality of MQI 104 is provided by a Web browser.

MQI 104 interacts with modem analysis server 140 via processor 116, LAN interface 120, LAN 130, and LAN interface 135. LAN interface 135 passes modem queries from modem checker client 100 to modem checker query processor 142 within modem analysis server 140. Modem analysis server 140 may be, without limitation, located in a cable network headend, in a cable network data center, in a network operations center or other suitable location determined by the cable network operator. In an embodiment of the present invention, modem checker query processor 142 comprises a Web server that provides Web pages to modem checker client 100 via MQI 104.

When modem analysis server 140 is first accessed by MQI 104, modem checker query processor 142 generates an interactive graphical display that accepts a modem MAC address. The user enters a modem MAC address which is passed via processor 116, LAN interface 120, LAN 130, to LAN interface 135 within modem analysis server 140. The LAN 130 and its associated interfaces, 120 and 135, provide a communication path between modem checker client 100 and modem analysis server 140. As will appreciated by those skilled in the art, LAN 130 may be, without limitation, a wired or wireless network and interfaces 120 and 135 are selected as appropriate to the network type.

Modem checker query processor 142 uses subscriber query library 144 and a central control system (CCS) query library 146 to obtain modem-related information from datastore 155. By way of illustration and not as a limitation, stored modem-related information comprises subscriber identifying data, account data, registration data, provisioning data, data associating modem 175 with particular cable network components, and data indicative of the current state of those cable network components to which the modem 175 is associated. These data provide a "picture" of the physical location where modem 175 is located in the cable network 165, the service level to which the subscriber is entitled, the service level to which the modem 175 has been configured, and the condition of the path between the modem 175 and the cable network 165.

While datastore 155 is illustrated as a single entity, stored data relevant to the status of a modem may be distributed among a number of databases and storage devices. As will be appreciated by those skilled in the art, datastore 155 comprises these databases and storage devices.

Modem checker query processor 142 also uses SNMP query library 148 to obtain diagnostic information directly from modem 175. Diagnostic information comprises values indicative of the state of the modem and logged historical data.

In an embodiment of the present invention, modem analysis server 140 further comprises a result analyzer 152 and a display server 154. Result analyzer 152 reviews the data acquired from modem query processor 140, determines if any of the values associated with a LVP are outside expected limits, and, if so, assigns graphical attributes to any data that are outside expected limits. By way of illustration and not as a limitation, a graphical attribute may be, without limitation, a display color, a display intensity, an object shape, and a display modulation, such as a blinking or motion. These data are passed to display server 154, which returns an interactive graphical display (see, FIG. 2, 200) to modem query interface 104. The content of the interactive graphical display represents an analytical record of modem 175. Modem query interface 104 then causes processor 116 to output the interactive graphical display to display 108.

In an embodiment of the present invention, cable modem 175 is associated with an optional router 190. In this configuration, the IP lease is issued by the cable service operator to optional router 190. The optional cable router 190 issues a public IP address lease to CPE 180 and performs network address translation (NAT) to route communications to CPE 180. Thus, cable modem 175 communicates to CPE 180 through optional router 190.

In an embodiment of the present invention, cable modem 175 and optional router 190 are integrated and function as a wireless modem/router. In this embodiment, the configuration of both the modem and the router 175/190 may be accessed remotely by the cable service operator.

Figure 2A:
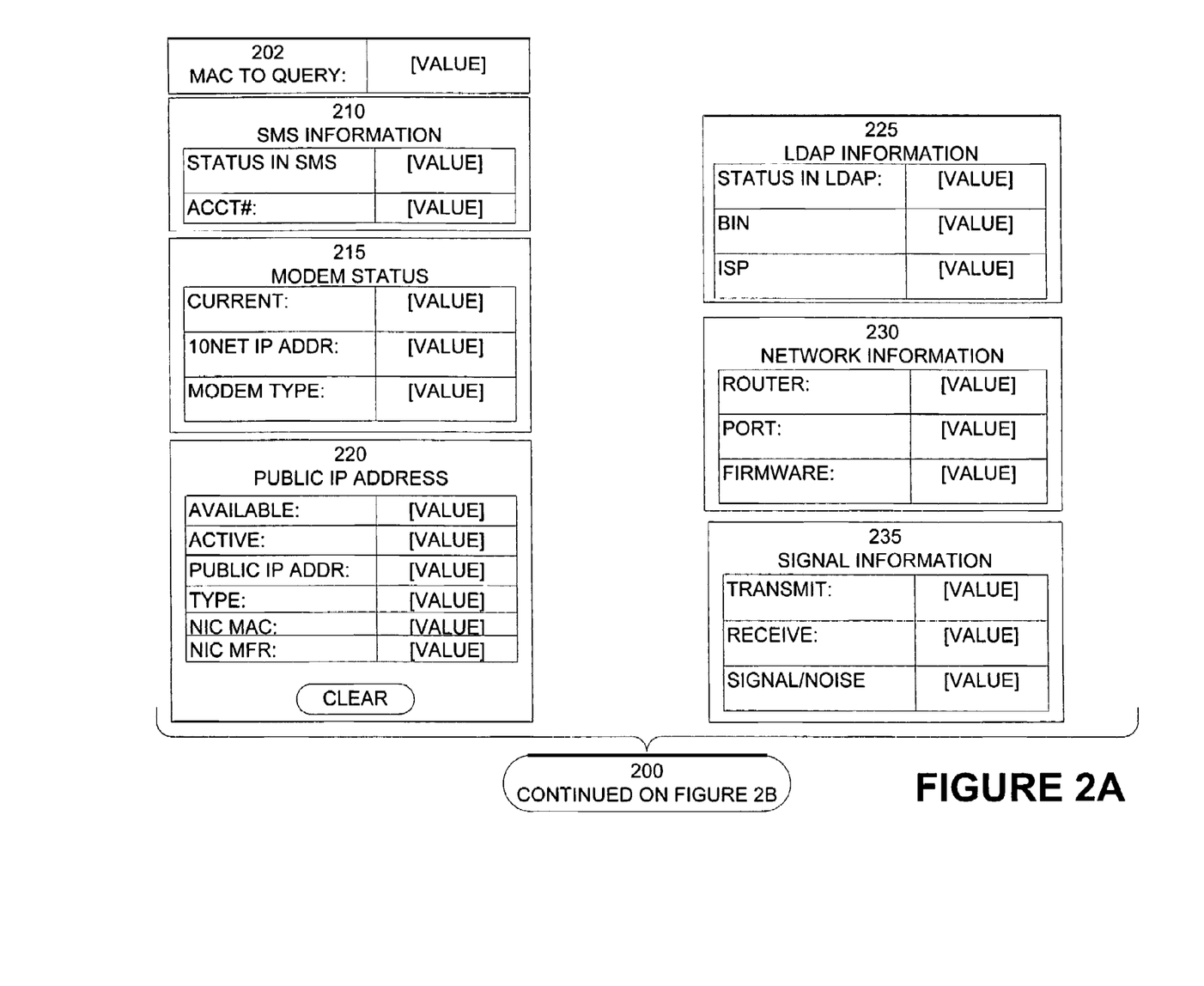
FIGS. 2A, 2B and 2C illustrate an interactive graphical display of a MQI according to an embodiment of the present invention.

FIGS. 2A, 2B, and 2C illustrate an interactive graphical display of a MQI according to an embodiment of the present invention. Referring to FIG. 2A, an interactive graphical display 200 comprises data blocks for SMS INFORMATION 210, MODEM STATUS 215, PUBLIC IP ADDRESS 220, LDAP INFORMATION 225, NETWORK INFORMATION 230, and SIGNAL INFORMATION 235. Datablocks further comprise label-value pairs (LVPs), where the label is a descriptor of a data element and the value represents the value assigned to the data element for a specified modem. The data blocks and the LVPs represent an analytical record of the specified modem.

Figure 2B:
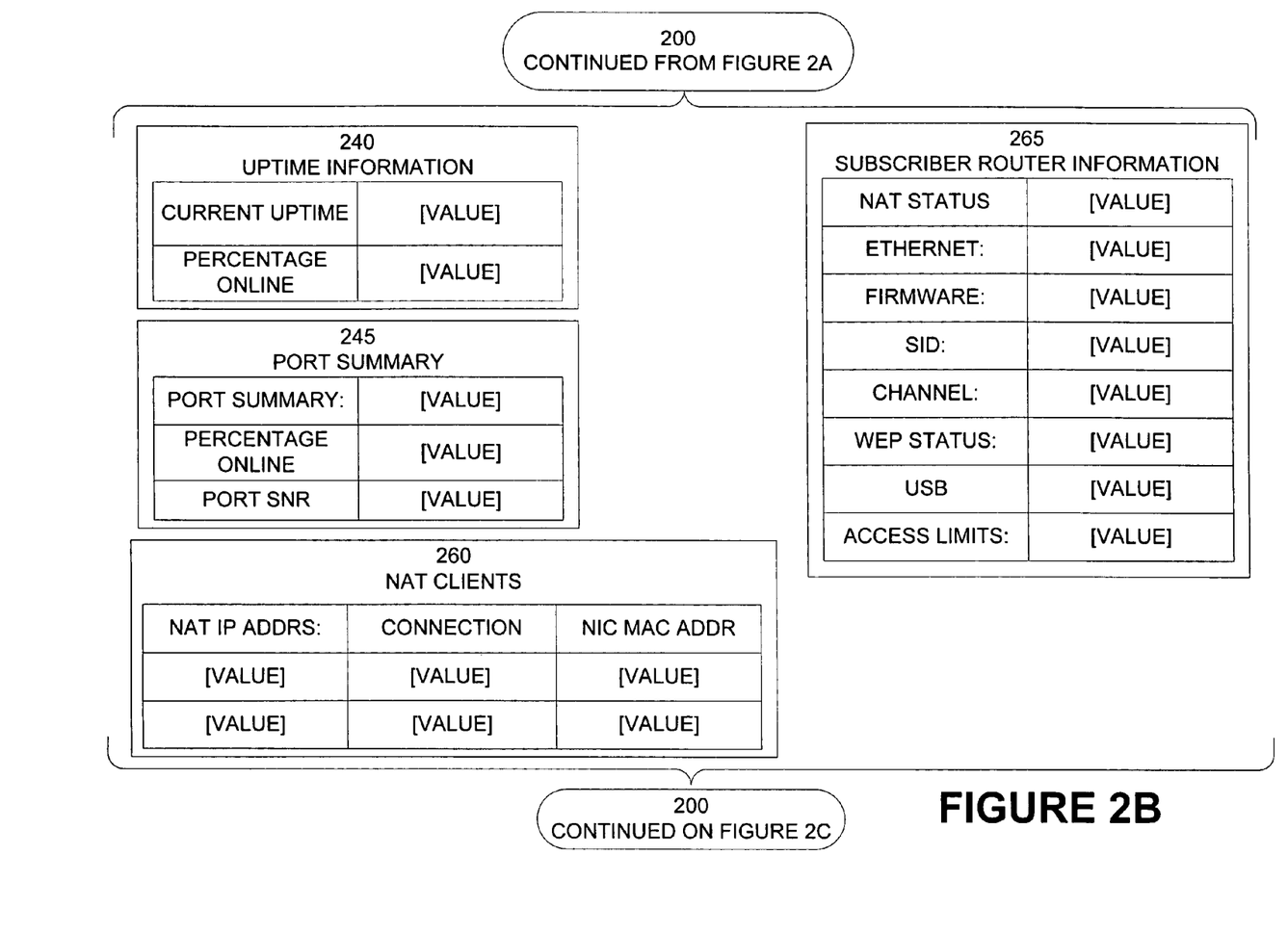

Referring to FIG. 2B, interactive graphical display 200 further comprises data blocks for UPTIME INFORMATION 240, PORT SUMMARY 245, NAT CLIENTS 260, and SUBSCRIBER ROUTER INFORMATION 265.

Figure 2C:
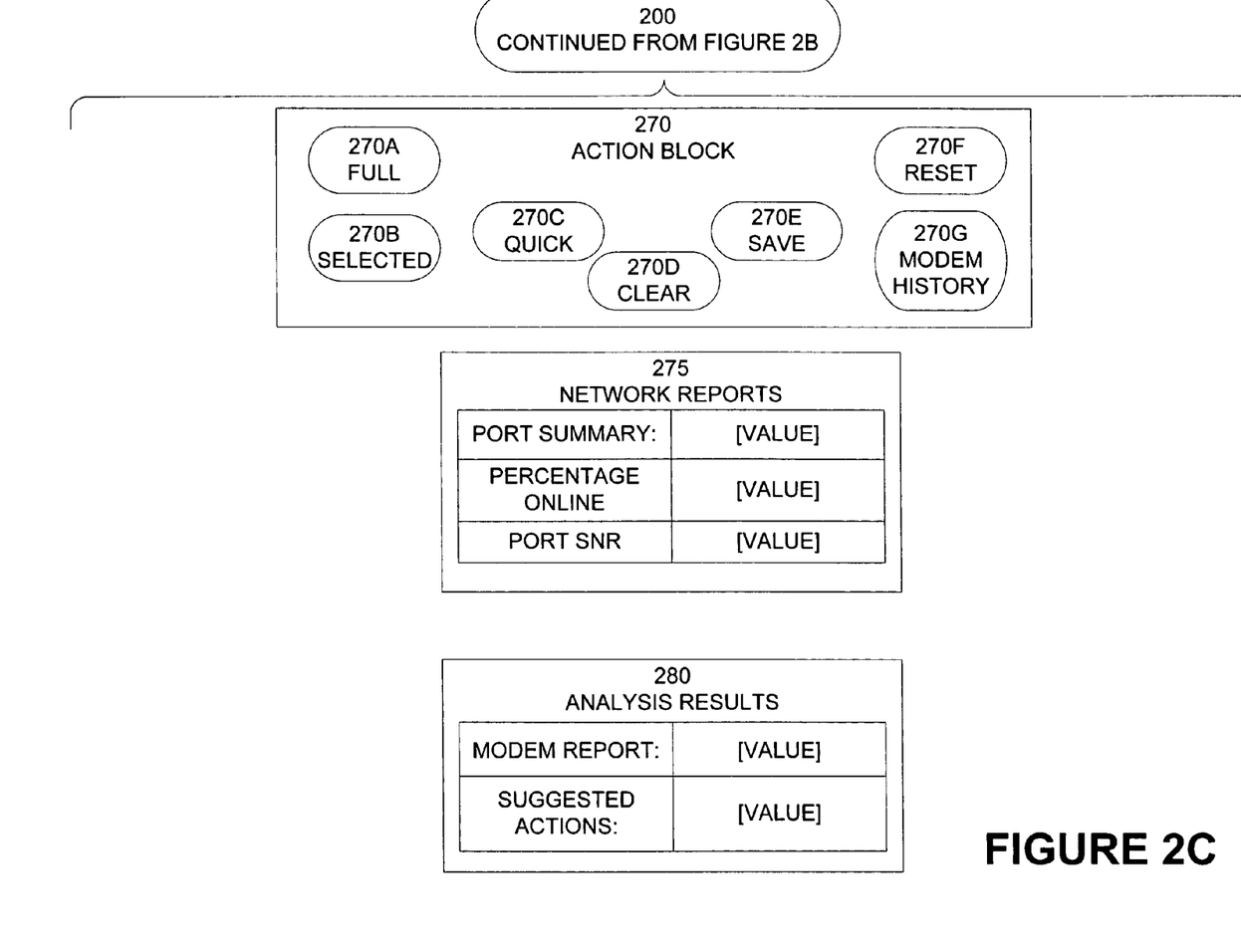

Referring to FIG. 2C, interactive graphical display 200 further comprises ACTION BLOCK 270 and data blocks for NETWORK REPORTS 275 and ANALYSIS RESULTS 280.

In an embodiment of the present invention, SMS INFORMATION 210 comprises LVPs "Status in SMS" and "Acct #." The label "Status" in SMS, has three possible values: Enabled, Disabled, or Not Found.

Enabled: the modem is present and enabled on an account in SMS, and has been assigned codes that allow it to get online.

Disabled: the modem is present on an account in SMS, but the account or the modem (or both) is not enabled.

Not Found: The modem is not associated with an account in the SMS.

The label "Acct #." has the value of the subscriber account number associated with the selected modem.

In an embodiment of the present invention, MODEM STATUS 215 comprises LVPs "current," "10NET IP Addr." and "Modem Type." The modem status LVP indicates whether the modem is on-line. The label "label "Current" has five possible values:

Online and Verified: The modem is identified as online according to data in datastore 155 and is responding to SNMP queries. What this means is that the UBR is saying that the modem is online, and the modem itself can be reached and is giving live responses.

Online and Unverified: The modem is identified as online according to data in datastore 155 and, but is not responding to SNMP Queries. This means that while the UBR says the modem is online, the modem is not giving live responses.

Disabled/Online: The modem is identified as online (disabled) according to data in datastore 155 and. This status may occur on new installs when the modem is plugged in before it has been added to the account or before it has been enabled in SMS. The modem still reports that it is disabled because it only checks LDAP when it first boots up.

Offline: The modem is identified as offline according to data in datastore 155 and is not responding to SNMP Queries.

Not Found. The modem is not listed on any UBR.

When the modem value of label Current is "on-line," the 10NET IP address label is assigned the value of the private IP address of the cable network facing interface. Additionally, the value of label Modem Type is assigned an identifier. In an embodiment of the present invention, the identifier is indicative of the manufacturer of the modem.

In an embodiment of the present invention, PUBLIC IP ADDRESS 220 comprises the LVPs "Available," "Active," "Public IP Addr.," "Type," "NIC MAC," and "NIC MFR." The value of the label "Available" represents the number of public IP addresses available for assignment to CPE connected to the modem. The value of the label "Active" is the number of IP addresses used by the subscriber. The value of the label "Public IP Addr." is the public IP address of the CPE connected to the modem as assigned by the binary file (BIN File) to the modem in LDAP and used to configure the modem on bootup. The label "Type" may have a value of either static or dynamic. The value associated with the label NIC MAC is the MAC address of the network interface card of the CPE to which the public IP address is assigned (static) or leased (dynamic). The value associated with label NIC MFR is the manufacturer of the NIC to which the public IP address has been assigned.

Data block PUBLIC IP ADDRESS 220 further comprises an object that when selected by a user causes MQI 104 to clear the MAC address of modem 175 from the UBR. The user can thus determine whether a currently connected computer is requesting an IP address through the modem.

In an embodiment of the present invention, LDAP INFORMATION 225 comprises LVPs "Status in LDAP," "BIN," and "ISP."

The value associated with the label "Status in LDAP" assumes the values described with respect to the "Status in SMS" label within SMS information 210. The label "BIN" receives as its value the file name of the binary provisioning file assigned to the modem. The label "Current ISP" receives as its value the name of the ISP to which the router is assigned.

In an embodiment of the present invention, NETWORK INFORMATION 230 comprises the LVPs "router," "port," and "firmware." The value of the label "router" is the UBR on which the modem was found. The value of the label "port" provides the port number on the UBR on which the modem was found. The value of the label "firmware" is either "current" or the actual firmware number of the modem. Clicking on the entry will launch a separate Firmware Upgrade window.

In an embodiment of the present invention, SIGNAL INFORMATION 235 comprises the LVPs "Transmit," "Receive," and "Signal/Noise." As long as the modem is online and responding, these LVPs will be assigned current values. The label "Transmit" is assigned a value associated with the upstream signal strength measured at the modem. The label "Receive" is assigned a value associated it downstream signal strength measured at the modem. The label "Signal/Noise', is assigned a value representing the signal to noise ratio of received signal as measured at the modem. In an embodiment of the present invention, the acceptable range of the value associated with the label Transmit is between 35 and 55 dB, the acceptable range of the value of the label Receive is between −10 and +10 dB, and the acceptable range of the label Signal/Noise is above 25. In another embodiment of the present invention, if the any of these values are out of range, the value fields are assigned a graphical attribute that change the manner in which the values are displayed. By way of illustration and not as a limitation, a value that is outside its set range may be displayed with a red background.

Referring to FIG. 2B, interactive graphical display 200 is further illustrated. In an embodiment of the present invention, UPTIME INFORMATION 240 comprises LVPs "Current Uptime," and "Percentage Online." Whenever a modem boots up, the UBR keeps track of the date/time. The label "Current Uptime" is assigned the value of the elapsed time since the modem was last booted. The label "Percentage Online" is assigned a value indicative of the time the modem has been online and offline since the very first time it was connected to the UBR.

In an embodiment of the present invention, PORT SUMMARY 245 comprise LVPs "Port Summary," "Percentage Online," and "Port SNR." The label "Port Summary" is assigned a value indicative of the number of modems on line relative to the number of modems assigned to the particular port. The label "Percentage Online, is assigned a value expressing the port summary value as a percent. The label "Port SNR" is assigned a value indicative of the port signal-to-noise ratio.

If the modem comprises a wireless router, additional information is present. In an embodiment of the present invention, NAT Clients 260 comprises LVPs "NAT IP Addresses," "Connection" and "NIC MAC Address." The label "NAT IP Addresses" is assigned values indicative of the public IP addresses assigned by the DHCP server within the modem's wireless router to CPE that has been connected to the router. The label "Connection" is assigned a value of either "wireless," Ethernet, or "USB" depending on how the CPE interfaces with the router. The label "NIC MAC Addresses" is assigned the value of the network interface card of the CPE that is connected to the router and assigned the corresponding public IP address.

In an embodiment of the present invention, Subscriber Router Information 265 comprises LVPs "NAT Status," "Ethernet," "Firmware," SID," "Channel," WEP Status," "USB," and "Access Limits." The label "NAT Status" is assigned a value that is either "enabled," or null. The label "Ethernet" is assigned a value of "connected" or "disconnected" indicative of whether an Ethernet NIC is connected to the router. The label "USB" is assigned a value of "connected" or "disconnected" indicative of whether an USB network interface is connected to the router. The label "Firmware" is assigned the value of the current firmware used by the router. The label "SID" is assigned the value of the system identifier selected by the user. The label "Channel" is assigned the value of the channel that the wireless network is using. The label "WEP Status" is assigned a value of enable if a wired encryption privacy key has been implemented by the user. The label "Access Limits" is assigned a value of enabled or disabled.

In an embodiment of the present invention, ACTION BLOCK 270 comprises linked objects that when selected by a user initiate action appropriate to the object. As illustrated in FIG. 2C, ACTION BLOCK 270 comprises a "full" object 270A, a "selected" object 270B, a "quick" object 270C, a "clear" object 270D, a "save" object 270E, a "reset" object 270F, and a "modem history" object 270G. The full, selected, and quick objects relate to the content of the report that interactive graphical display 200 will display. In an embodiment of the present invention, selecting the full object 270A causes MQI 104 to request data values for all of the LVPs of interactive graphical display 200. Selecting the quick object 270C causes MQI 104 to request data values for a predetermined set of LVPs of interactive graphical display 200. In another embodiment of the present invention, data blocks 210, 215, 220, 225, 230, 235, 240, 245, 260, and 265 may be selected by a user. Selecting the selected object 270B causes MQI 104 to request data values for the selected LVPs of interactive graphical display 200.

Referring again to ACTION BLOCK 270, selecting the reset object 270F causes a 'reset' command to be sent to the cable modem (see, FIG. 1, 175) via SNMP.

Selecting the modem history object 270G causes the modem checker client (see, FIG. 1, 100) to display an historical view of the signal levels on the modem. This historical view comprises the latest signal level readings, as well as the highest and lowest readings reported in the history. In an embodiment of the present invention, the modem checker query processor (see, FIG. 1, 142) runs a nightly scan of one seventh of the network. In the course of a week each modem is checked once. Additionally, the readings retrieved by modem checker query processor 142 in response to queries from the MQI (see, FIG. 1, 104) are added to these results. This is particularly useful in dealing with ongoing intermittent connection problems.

Selecting the save object 270E causes the selected settings to be saved as a custom settings file associated with the selected object 270B. The next time MQI 104 is initiated, the data blocks that were saved will be pre-selected.

Selecting the clear object 270D causes all data blocks to be displayed in an "unselected" state.

In an embodiment of the present invention, NETWORK REPORTS 275 comprise LVPs "Port Summary," "Percentage Online," and "Port SNR." The label "Port Summary" is assigned a value indicative of the number of modems on line relative to the number of modems assigned to the particular port. The label "Percentage Online" is assigned a value expressing the port summary value as a percent. The label "Port SNR" is assigned a value indicative of the port signal-to-noise ratio.

In an embodiment of the present invention, ANALYSIS RESULTS 280 comprises the LVPs "Network Node Outages," "Modem Report," and "Suggested Actions."

The diverse data acquired by the modem checker analysis system provides a "snapshot" of the state of a cable modem (see, FIG. 1, 175) and permits a technician to diagnose the cause of a service problem potentially involving cable modem 175. By way of illustration and not as a limitation, referring again to FIG. 2, PUBLIC IP ADDRESSES block 212, the value of the label "Active" may exceed the value of the label "Available." When there are more addresses Active than Available, it suggests that the subscriber has attempted to get online with more than one device. This can indicate that the subscriber is swapping between computers, or between a computer and a router. The label "NIC MAC Address, has the value of the MAC Address of the adapter to which the public IP Address has been assigned. This can be useful for differentiating between multiple computers when troubleshooting.

Figure 3:
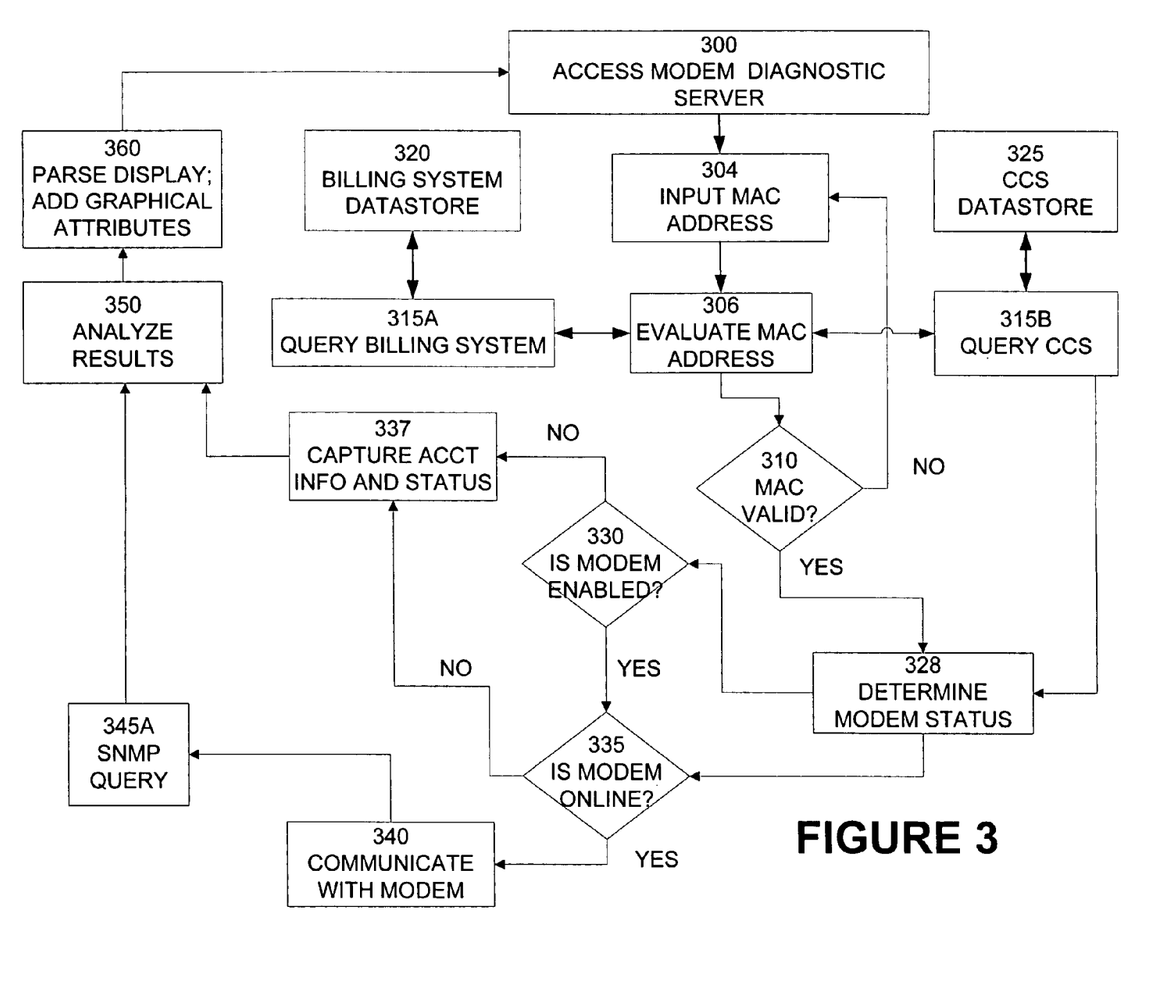
FIG. 3 illustrates a flow of a process by which a modem checker client is used to troubleshoot a modem according to an embodiment of the present invention.

FIG. 3 illustrates a flow of a process by which a modem checker client is used to troubleshoot a modem according to an embodiment of the present invention.

Referring to FIG. 3, a user accesses a cable modem analysis server 300 and receives an interactive graphical display comprising multiple LVPs and hyperlinked objects. The user enters a MAC address in a field of the interactive graphical display 304. Data is acquired to evaluate the MAC address that was entered 306. The cable modem query processor (see, FIG. 1, 142) simultaneously launches a billing system query 315A and a CCS query 315B. The billing system query is generated by reference to a subscriber query library (see, FIG. 1, 144) that comprises data request scripts constructed to obtain particular data elements from the billing system datastore 320. Similarly, the CCS query is generated by reference to a CCS query library (see, FIG. 1, 146) that comprises data request scripts constructed to obtain particular data elements from the CCS datastore 325. The queries return data that is used to evaluate the cable modem MAC. By way of illustration and not as a limitation, the billing system query returns a subscriber account number and information as to whether the subscriber is entitled to receive service. The CCS query confirms whether the cable modem associated with the cable modem MAC address is "known" to the network.

A determination is made whether the cable modem MAC address is valid 310. If the MAC address in not valid, the user is prompted again to enter a MAC address 304. If the MAC address is valid, then the cable modem status is determined 328. A DNS query is issued 315B for data in the CCS datastore 325 relating to whether the cable modem is enabled 330 and if the cable modem is online 335. If the cable modem is not enabled and/or the cable modem is not online, the account information associated with the cable modem and status of the cable modem are captured 337 and passed to a result analyzer (see, FIG. 1, 152) where the results are analyzed 350. Data is parsed 360 to so as to associate a value with a label to produce an interactive graphical display (see, FIG. 2) and returned to user for display.

If the cable modem is determined to be enabled and online, communication with the cable modem is initiated 340. In an embodiment of the present invention, this communication is accomplished by issuing an SNMP 345 query of the cable modem. The SNMP query is generated by reference to a SNMP query library (see, FIG. 1, 148) that comprises data request scripts constructed to obtain particular data elements from the cable modem that are available through SNMP.

The results of the SNMP query, along with account information associated with the cable modem and status of the cable modem are passed to a result analyzer (see, FIG. 1, 152) where the results are analyzed 350. Data is parsed 360 to so as to associate a value with a label to produce an interactive graphical display (see, FIG. 2) and returned to user for display.

One of the benefits of using the modem checker client of the present invention is that it establishes a standardized troubleshooting methodology by insuring that each technical service representative has the same information in the same format available to diagnose issues. This allows for directed training at issues and resolutions which was not possible before.

A cable modem analysis system and method therefore for an HFC cable network have been described. It will be understood by those skilled in the art that the present invention may be embodied in other specific forms without departing from the scope of the invention disclosed and that the examples and embodiments described herein are in all respects illustrative and not restrictive. Those skilled in the art of the present invention will recognize that other embodiments using the concepts described herein are also possible. Further, any reference to claim elements in the singular, for example, using the articles "a," "an," or "the" is not to be construed as limiting the element to the singular. Moreover, a reference to a specific time, time interval, and instantiation of scripts or code segments is in all respects illustrative and not limiting.

What is claimed is:

1. A cable modem (CM) analysis server for a hybrid-fiber-coax (HFC) cable network comprising:
   a simple network management protocol (SNMP) query library, wherein the query library comprises instructions for acquiring and reporting CM state data elements responsive to an SNMP query and indicative of a state of a CM from the CM;
   a subscriber query library, wherein the subscriber query library comprises instructions for acquiring and reporting subscriber information from a billing datastore in response to a subscriber query, wherein the subscriber information comprises a subscriber account number;
   a central control system (CCS) query library, wherein the CCS library comprises instructions for determining and reporting in response to a CSS query whether a CM MAC address is known to the network;
   a query checker processor, wherein the query checker processor comprises instructions that configure the query checker processor to perform operations comprising:
      generating an interactive graphical display that accepts a client query from a CM checker client, wherein the interactive graphical display comprises a MAC address field and wherein the client query identifies queried CM state data elements to be obtained for the CM;
      receiving a MAC address associated with a CM that is entered into the MAC address field;
      sending the subscriber query and the CCS query;
      determining from a response to the subscriber query and the CCS query whether the entered MAC address is valid;
      when the entered MAC address is valid, then generating and sending a DNS query for status data in a CCS datastore, wherein the status data are indicative of whether the CM associated with the entered MAC address is enabled and online; and when the entered MAC address is entered and online, then generating and sending the SNMP query for CM state data elements of the CM associated with the entered MAC address and responsive to the SNMP query, wherein the SNMP query is generated by reference to the queried CM state data elements and the SNMP query library; and sending the subscriber information, the CM state data elements responsive to the SNMP query, and the status data to a results analyzer;

the results analyzer, wherein the results analyzer comprises instructions that configure the results analyzer to perform the operations comprising:

receiving the subscriber information, the CM state data elements responsive to the SNMP query, and the status data;

determining whether a CM state data element is within a predetermined range;

assigning a first graphical attribute to each CM state data element that is outside a predetermined range; and sending the subscriber information, the CM state data elements responsive to the SNMP query, and the first graphical attribute to a display server; and the display server, wherein the display server comprises instructions that configure the display server to perform operations comprising:

receiving the subscriber information, the CM state data elements responsive to the SNMP query, the status data and the first graphical attribute;

creating a CM analytical record from the subscriber information, the CM state data elements responsive to the SNMP query, the status data and the first graphical attribute; and sending the CM analytical record to the CM checker client for display.

2. The CM analysis server of claim 1, wherein the modem checker client comprises a Web browser and wherein the CM analytical record comprises a Web page.

3. The CM analysis server of claim 1, wherein CM state data elements are selected from the group consisting of subscriber data, CM operational data, network component data, and CM diagnostic data.

4. The CM analysis server of claim 3, wherein the subscriber data comprise a subscriber name, a subscriber address, an account number associated with the subscriber name, the MAC address of the CM, and the subscriber account status.

5. The CM analysis server of claim 3, wherein the CM operational data comprise a CM current status, a private network address assigned to the CM, a modem type, available IP addresses, active IP addresses, a public IP address, a type, a NIC MAC, a status in LDAP, a provisioned BIN FILE, and a hosting ISP.

6. The CM analysis server of claim 5, wherein the CM comprises a wireless router and wherein the CM operational data further comprise network address translation (NAT) client data, NAT status, Ethernet connection status, router firmware identifier, wireless system identifier, transmission channel, wired equivalency privacy status, and access limits.

7. The CM analysis server of claim 3, wherein the network component data comprise a network router identifier, a network port identifier, the firmware of the router, a port summary, a port percentage online, a port SNR.

8. The CM analysis server of claim 3, wherein the CM diagnostic data comprise an uptime measure, a transmit signal level, a receive signal level, and a modem SNR.

9. The CM analysis server of claim 1, wherein the results analyzer further comprises instructions that configure the results analyzer to perform operations comprising:

assigning a second graphical attribute to the CM state data element if the CM state data element is within the predetermined range; and providing the CM state data element and the assigned second graphical attribute to the display server, wherein the display server further comprises instructions that configure the display server to perform operations comprising using the CM state data element and the assigned second graphical attribute to create the analytical record.

10. The CM analysis server of claim 9, wherein the first and second graphical attributes are display colors.

11. The CM analysis server of claim 1, wherein the results analyzer further comprises instructions that configure the results analyzer to perform operations comprising:

selecting CM state elements determined to be outside a predetermined range;

determining if the selected CM state elements are indicative of a common fault;

and if the selected CM state elements are indicative of a common fault, identifying the common fault in the analytical record.

12. The CM analysis server of claim 1 further comprising a client network interface configured for communicating with the CM checker client via a client network.

13. The CM analysis server of claim 12, wherein the client network is selected from the group consisting of a wired network, a wireless network, a local area network, and the Internet.

14. The CM analysis server of claim 1 further comprising a cable network interface configured for command communicating with the CM via a cable network path.

15. The CM analysis server of claim 14, wherein the path in the cable network path is a DOCSIS-compliant channel.

16. A method for evaluating the operational status of cable modems (CMs) connected to a hybrid-fiber-coax (HFC) cable network comprising:

generating at a query checker processor an interactive graphical display that accepts a client query from a CM checker client, wherein the interactive graphical display comprises a MAC address field and wherein the client query identifies queried CM state data elements to be obtained for the CM;

receiving a MAC address associated with the CM that is entered into the MAC address field;

generating the subscriber query using a subscriber query library, wherein the subscriber query library comprises instructions for inclusion in the subscriber query for acquiring and reporting subscriber information from a billing datastore;

generating the CCS query using a CCS query library, wherein the CCS query library comprises instructions for inclusion in the CCS query for determining and reporting whether a CM MAC address is known to the network and instructions for inclusion in a DNS query for determining and reporting in response to the DNS query whether the CM is enabled and online;

sending the subscriber query and the CCS query:

determining from a response to the CCS query whether the entered MAC address is valid;

when the entered MAC address is valid, then generating and sending the DNS query for status data in a CCS datastore;

determining from the status data whether the CM associated with the entered MAC address is enabled and online; and when the entered MAC address is enabled and online, then generating and sending a simple network management protocol (SNMP) query for CM state data elements of the CM associated with the entered MAC address and responsive to the SNMP query, wherein the SNMP query is generated by reference to the queried CM state data elements and an SNMP query library, and wherein the SNMP query library comprises instructions for inclusion in the SNMP query for acquiring and reporting CM state data elements indicative of a state of a CM from the CM; and sending the subscriber information, the CM state data elements responsive to the SNMP query, the CM state data elements responsive to the CLI query, and the status data to a results analyzer;

receiving the subscriber information, the CM state data elements responsive to the SNMP query, the CM state data elements responsive to the CLI query, and the status data at the results analyzer;

determining at the results analyzer whether a CM state data element is within a predetermined range;

assigning a first graphical attribute to each CM state data elements that is outside the predetermined range;

sending the subscriber information, the CM state data elements responsive to the SNMP query, the CM state data elements responsive to the CLI query, the status data, and the first graphical attribute to a display server;

receiving the subscriber information, the CM state data elements responsive to the SNMP query, the CM state data elements responsive to the CLI query, the status data and the first graphical attribute at the display server;

creating a CM analytical record from the subscriber information, the CM state data elements responsive to the SNMP query, the CM state data elements responsive to the CLI query, the status data and the first graphical attribute; and sending the CM analytical record to the CM checker client for display.

17. The method of claim 16, wherein the modem checker client comprises a Web browser and wherein the CM analytical record comprises a Web page.

18. The method of claim 16, wherein the CM state data elements are selected from the group consisting of subscriber data, CM operational data, network component data, and CM diagnostic data.

19. The method of claim 18, wherein the subscriber data comprise a subscriber name, a subscriber address, an account number associated with the subscriber name, a MAC address of the CM, and a subscriber account status.

20. The method of claim 18, wherein the CM operational data comprise a CM current status, a private network address assigned to the CM, a modem type, available IP addresses, active IP addresses, a public IP address, a type, a NIC MAC, a status in LDAP, a provisioned BIN file, and a hosting ISP.

21. The method of claim 20, wherein the CM comprise a wireless router and wherein the CM operational data further comprise network address translation (NAT) client data, NAT status, Ethernet connection status, router firmware identifier, wireless system identifier, transmission channel, wired equivalency privacy status, and access limits.

22. The method of claim 18, wherein the network component data comprise a network router identifier, a network port identifier, the firmware of the router, a port summary, a port percentage online, a port SNR; and wherein the CM diagnostic data comprise an uptime measure, a transmit signal level, a receive signal level, a modem SNR.

23. The method of claim 18, wherein the CM diagnostic data comprise an uptime measure, a transmit signal level, a receive signal level, and a modem SNR.

24. The method of claim 16 further comprising:
assigning a second graphical attribute to the CM state data element if the CM state data element is within the predetermined range;
providing the CM state data element and assigned second graphical attribute to the display server; and
creating the analytical record using the CM state data element and the assigned second graphical attribute.

25. The method of claim 16, wherein the first and second graphical attributes are display colors.

26. The method of claim 16 further comprising:
selecting CM state elements determined to be outside a predetermined range;
determining if the selected CM state elements are indicative of a common fault; and
identifying the common fault in the CM analytical record if the selected CM state elements are indicative of a common fault.

27. The method of claim 16, wherein executing the query instructions to obtain the queried CM state data elements comprises communicating with the CM via a cable network path.

28. The method of claim 27, wherein the cable network path is a DOCSIS-compliant channel.

29. The method of claim 16, wherein receiving a query from a modem checker client comprises receiving the query from the CM checker client via a client network.

30. The method of claim 29, wherein the client network is selected from the group consisting of a wired network, a wireless network, a local area network, and the Internet.

* * * * *